United States Patent
Born

(10) Patent No.: US 6,631,484 B1
(45) Date of Patent: *Oct. 7, 2003

(54) SYSTEM FOR PACKET COMMUNICATION WHERE RECEIVED PACKET IS STORED EITHER IN A FIFO OR IN BUFFER STORAGE BASED ON SIZE OF RECEIVED PACKET

(75) Inventor: Richard M. Born, Fort Collins, CO (US)

(73) Assignee: LSI Logic Corporation, Milpitas, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/052,714

(22) Filed: Mar. 31, 1998

(51) Int. Cl.[7] .............................................. G06F 12/02
(52) U.S. Cl. ................... 714/129; 370/395; 370/400; 370/414; 370/463; 710/4; 710/52; 710/53; 710/56
(58) Field of Search ................. 370/395, 400, 370/403, 412, 413, 414, 506; 395/500.45, 500.47, 527; 709/228, 236, 237, 250; 710/4, 14, 28, 113, 128, 129, 52, 53, 56; 712/300

(56) References Cited

U.S. PATENT DOCUMENTS

| | | | |
|---|---|---|---|
| 4,852,088 A | * 7/1989 | Gulick et al. | 370/413 |
| 5,136,582 A | 8/1992 | Firoozmand | 370/400 |
| 5,150,465 A | 9/1992 | Bush et al. | 710/14 |
| 5,191,653 A | 3/1993 | Banks et al. | 710/113 |
| 5,210,749 A | 5/1993 | Firoozmand | 370/463 |
| 5,349,649 A | 9/1994 | Iijima | 709/228 |
| 5,457,785 A | 10/1995 | Kikinis et al. | 710/128 |
| 5,488,694 A | 1/1996 | McKee et al. | 710/4 |
| 5,491,812 A | 2/1996 | Pisello et al. | 709/236 |
| 5,499,378 A | 3/1996 | McNeill, Jr. et al. | 395/500.45 |
| 5,535,197 A | 7/1996 | Cotton | 370/414 |
| 5,572,676 A | 11/1996 | Ohnishi | 709/250 |
| 5,590,313 A | 12/1996 | Reynolds et al. | 395/500.47 |
| 5,610,914 A | 3/1997 | Yamada | 370/395 |
| 5,633,865 A | * 5/1997 | Short | 370/412 |
| 5,644,577 A | 7/1997 | Christensen et al. | 370/506 |
| 5,649,128 A | 7/1997 | Hartley | 710/129 |
| 5,678,064 A | 10/1997 | Kulik et al. | 710/28 |
| 5,680,592 A | 10/1997 | Priem | 395/527 |
| 5,768,275 A | * 6/1998 | Lincoln et al. | 370/419 |
| 5,778,414 A | * 7/1998 | Winter et al. | 711/5 |
| 5,797,033 A | * 8/1998 | Ecclesine | 710/22 |
| 5,841,988 A | * 11/1998 | Chennubhotla et al. | 709/237 |
| 5,860,149 A | * 1/1999 | Fiacco et al. | 711/209 |
| 5,961,640 A | * 10/1999 | Chambers et al. | 712/300 |

* cited by examiner

Primary Examiner—Thomas C. Lee
Assistant Examiner—Chien Yuan

(57) ABSTRACT

An interface apparatus provides a connection between a host having an IEEE 1394 input/output port and a mass storage device having an ATA input/output port. A receive FIFO and a transmit FIFO within the interface apparatus operates to store small-size packets, or operates to store the buffer address of large-size packets, as the small and large size packets are respectively received from the host or transmitted to the host. In both the host receive and host transmit modes of operation of the interface apparatus, the small-size packets are found in the receive FIFO or the transmit FIFO, whereas the data content of large-size packets is stored in the buffer as the corresponding buffer address is stored in the receive FIFO or the transmit FIFO.

42 Claims, 7 Drawing Sheets

SYSTEM FOR PACKET COMMUNICATION WHERE RECEIVED PACKET IS STORED EITHER IN A FIFO OR IN BUFFER STORAGE BASED ON SIZE OF RECEIVED PACKET

CROSS-REFERENCE TO RELATED APPLICATIONS

U.S. patent application Ser. No. 09/052,715, filed Mar. 31, 1998, and entitled METHOD AND SYSTEM FOR CONVERTING COMPUTER PERIPHERAL EQUIPMENT TO SCSI-COMPLIANT DEVICES, by Richard M. Born, is incorporated herein by reference.

This patent application describes a method and system for converting computer peripheral equipment to devices able to communicate in Small System Interface (SCSI) commands.

BACKGROUND OF THE INVENTION

1. Field of the Invention

This invention relates to the field of computing or data processing, and more specifically, to an IEEE 1394-to-ATA interface unit having two small size First In First Out (FIFO) queues that are associated with both a receive data path and a transmit data path.

2. Description of the Related Art

As used herein, the term ATA refers to an interface specification for Integrated Drive Electronics (IDE) drives; for example, hard disk mass storage devices having a built-in controller. IDE drives often connect via an ATA interface, such as a flat ATA ribbon cable, to an IDE host adapter that plugs into an expansion slot within a personal computer.

The use of transmit and receive FIFOs in a data processing system is known. For example, U.S. Pat. No. 5,136,582 to Firoozmand describes, relative to FIG. 5, an output buffer (120) that is connected to a DMA controller (124) by way of a receive path that includes, in series, a physical RCV FIFO, a logical SRAM receive-FIFO, and a physical RCV FIFO (175), and a transmit path that includes, in series, a physical XMT FIFO, one but preferably four logical transmit FIFOs (177), and a physical XMT FIFO. U.S. Pat. No. 5,210,749 to Firoozmand is generally similar.

U.S. Pat. No. 5,572,676 to Ohnishi teaches the use of a transmission FIFO and a reception-FIFO U.S. Pat. No. 5,644,577 also teaches the use of FIFOs to buffer transmit and receive portions of a data frame, wherein the data-frame is stretched or compressed, as necessary, to match available data to the FIFO buffers.

U.S. Pat. No. 5,535,197 to Cotton is of general interest in that it describes a buffered communication switch for use in an ATM system having a switching-module that includes a shared memory buffer. When a data cell is received, the cell's header is translated to determine cell routing and cell priority. The cell is then stored at a vacant address in a shared memory buffer, as the cell's address is placed in a FIFO queue at the appropriate exit port. When time is available for transmission on an outgoing link, the data cell corresponding to the address that is at the front of the exit port's queue is transmitted toward its destination. U.S. Pat. No. 5,610,914 also teaches the use of a shared memory buffer for an ATM switching system and includes address pointers that are stored in FIFOs.

U.S. Pat. No. 5,488,694 to McKee et at is also noted for its use of a FIFO register.

The above-mentioned patents are incorporated herein by reference for the purpose of indicating the background of the invention and/or as illustrating the state of the art.

While the above-noted patents are of general utility for their stated purposes, the need remains in the art for a data processing system that is especially constructed and arranged to process the continuous asynchronous transmission and reception of relatively small-size data packets, while at the same time, enabling the asynchronous transmission and reception of a half-duplex stream of relatively large size data packets.

SUMMARY OF THE INVENTION

This invention relates to a data processing system that is especially constructed and arranged to process the continuous asynchronous transmission and reception of relatively small-size data packets while, at the same time, enabling the asynchronous transmission and reception of a half-duplex stream of relatively large-size data packets. By way of example only, small-size data packets comprise about 4 quadlets of data in size (i.e., about 16-bytes of data), whereas large-size data packets are of a size that is about 2K plus 16-bytes of data.

In order to accomplish two-way data transmit/receive functions in an IEEE 1394-to-ATA interface unit, a relatively small-size receive FIFO is associated with one data path, and a relatively small-size transmit FIFO is associated with a second data path. In the operation of the invention, the small-size data packets are directly handled by the FIFOs, whereas these same FIFOs operate to store the time order, or the as-received queue, of the large-size transmit and receive data packets, as the data content of these large-size data packets is stored in a larger data bank, or buffer, that is capable of both a data transmit and a data receive function. This invention optimizes the size of the two FIFOs and the data bank for a given size of a relatively large size core data storage that is associated therewith.

In an embodiment of the invention, the two above-mentioned FIFOs each comprised 64 individually addressable quadlets (a quadlet equals 4 bytes) of RAM data storage, the data bank or buffer comprised a first RAM data bank 0 and a second RAM data bank 1, each of which comprises 512 quadlets of data storage, and the two FIFOs and two data banks were associated with core data storage that comprised 512K bytes of data storage. While two FIFOs are required for proper operation in accordance with this invention, the number of data banks is not critical.

The small-size data packets are received or transmitted asynchronously; that is, the small-size data packets are received without a regular or a predictable time relationship following the execution of an I/O request. Since the large-size data packets are received or transmitted asynchronous half-duplex (that is, in only one direction at a time), the headers of the large-size data packets can be FIFO stored, as the corresponding data content is stored in a data bank. As a result of the use of these two FIFOs, two messages going in either direction can be queued up.

In the operation of the invention, the headers of half-duplex large-size data packets are always obtained from the transmit FIFO for a transmit operation, and are always placed in the receive FIFO for a receive-operation. Any given header identifies, addresses, or points to the storage location in the data bank whereat data corresponding to the given header will be found for a transmit operation, or the given header contains the address of the storage location in a data bank whereat the data corresponding to the given header is stored for a receive operation.

For example, in an asynchronous half-duplex transmit-operation involving a large-size data packet, the packet's header is first fetched from the head end storage position within the transmit FIFO, the address that is within this fetched header is read, the data at this address is fetched from a data bank, and the transmission is completed. In a receive operation, the data portion of an asynchronously received half-duplex large-size data packet is placed in a given storage location within a data bank, and the tail end storage location of the receive FIFO is loaded with a header that contains the address of this given storage location, whereupon the receive operation is completed.

As a feature of the invention, a special segment of RAM is provided for use as a general purpose scratch pad. For example, this special segment RAM can be set up as 16 different Operational Request Block (ORB) locations, each location of which can be used to store a 32-byte ORB. The header for each such ORB is placed in the receive FIFO, whereas the data content of the ORB itself is placed in this special segment RAM.

The above-mentioned ORBs are the means by which a request (for example, a read request or a write request), is communicated to a target mass storage device. For example, each 32-byte ORB contains a fixed format.

The above-mentioned bank 0 storage, bank 1 storage, receive FIFO storage, transmit FIFO storage, and special segment storage are preferably all contained within a buffer RAM that is partitioned to provide these dedicated storage areas. A buffer manager provides an interface to the buffer RAM for a link module, for an auto sequencer, and for microcontroller interface modules.

The receive FIFO receives small-size data packets from a link module, and only one link module has access to the receive-FIFO at any given time. All such small-size data packets are serviced in the order that they are received.

The transmit FIFO is used to send large-size data packets to a link module, and only one link module can communication with the transmit FIFO at any given time. All large-size data packets are transmitted in time order.

An object of this invention is to provide an interface unit that operates as a bridge between the IEEE-1394-port of a device, such as a host computer and the ATA-port of an ATA I/O device such as a mass storage device.

Another object of this invention is to provide an interface unit bridge that enables an ATA-compatible I/O device to be located a relatively long distance from a 1394-compatible host by making use of the desirable operating characteristics of a 1394 cable to enable an interface unit and the I/O device (a target device) to be located at a relatively long distance from the host; i.e., at a distance that is not supported by the operational characteristics of an ATA interface.

Another object of this invention is to provide a method and an apparatus providing for communication of small byte-size packets and large byte-size packets from a first to a second port, including FIFO storage and buffer storage. The reception of a small byte-size packet at the first port causes the small byte-size packet to be stored in a tail end storage location of the FIFO storage. The reception of a large byte-size packet at the first port causes the large byte-size packet to be stored in an addressable storage location of the buffer storage, and causes an address of this addressable storage location to be stored in a tail-end storage location of the FIFO storage. The subsequent presence of the small byte-size packet in a head end storage location of the FIFO storage causes the small byte-size packet to be transmitted to the second port. The subsequent presence of the address of the addressable storage location in a head end storage location of the FIFO storage causes the large byte-size packet to be fetched from the buffer byte storage and causes the large byte-size packet to be transmitted to the second port.

These and other objects, features and advantages of this invention will be apparent to those of skill from the following detailed description, which description makes reference to the drawing.

Another object of this invention is to provide a means for the large-sized packets to be handled at a different rate than the small-sized packets, thus allowing control streams to run asynchronous to data streams.

DESCRIPTION OF THE PREFERRED EMBODIMENT

Figure 1:
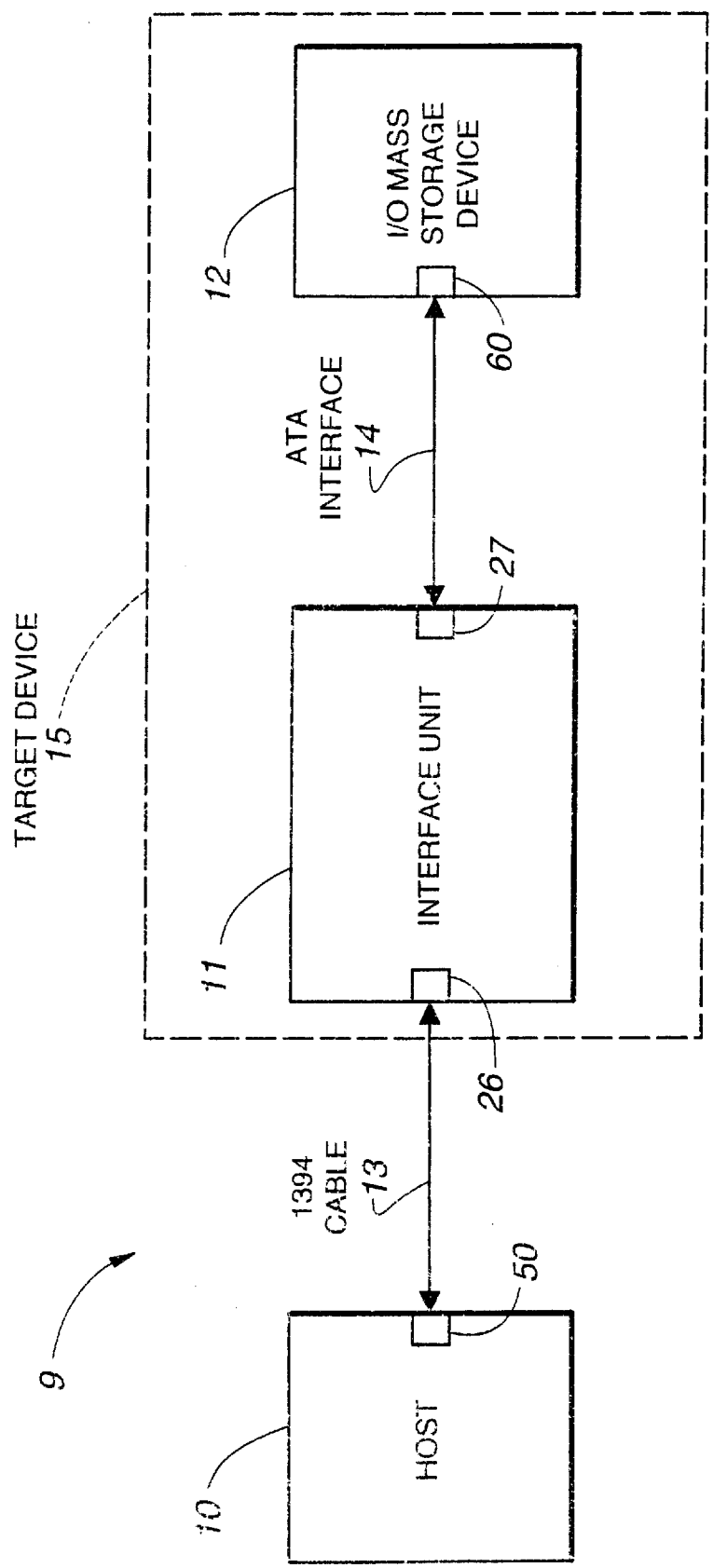
FIG. 1 is a showing of a data processing system that includes a host, a 1394-to-ATA interface unit that is constructed and arranged in accordance with the present invention, and a mass storage device.

FIG. 1 shows a data processing system 9 that includes a 1394-to-ATA interface unit 11 constructed and arranged in accordance with the present invention. In this example, interface unit 11 operates as a bridge between an I/O mass storage device 12 having an ATA port 60 and a host computer 10 having a 1394-port 50. Without limitation thereto, mass storage device 12 may comprise CD ROM technology, magnetic tape technology, and/or magnetic disk technology.

In this system, a relatively long, high-speed bit-serial, IEEE 1394 cable 13 interconnects host 10 and interface unit 11, and a relatively short, bit parallel, ATA interface 14 interconnects interface unit 11 and mass storage device 12.

Interface unit 11 in accordance with this invention operates as a bridge between the 1394 protocol of cable 13 and the ATA protocol of interface 14. In the operation of FIG. 1, host 10 considers the two units 11, 12 that are contained within broken line 15 as an IEEE 1394 target device 15.

Target device 15 is, in essence, a 1394 device that arbitrates for the bit serial cable, or bus 13, and that performs bit parallel read and write transactions to specified addresses of mass storage device 12.

By way of example only, an embodiment of an interface unit 11 of this invention was constructed and arranged to support the following ATA transfer modes: PIO mode 0-4, DMA mode 0-2, and Ultra DMA mode 0-2. In addition, this embodiment of interface unit 11 was ATAPI/ATA-4 compatible.

A valuable utility of interface unit 11 is to enable target device 15 to be physically located-a relatively long distance from host 10. That is, the operational characteristics of the 1394 cable 13 enable target device 15 to be located at a relatively long distance from host 10; i.e., at a distance that is not supported by the operational characteristics of an ATA interface.

Figure 2:
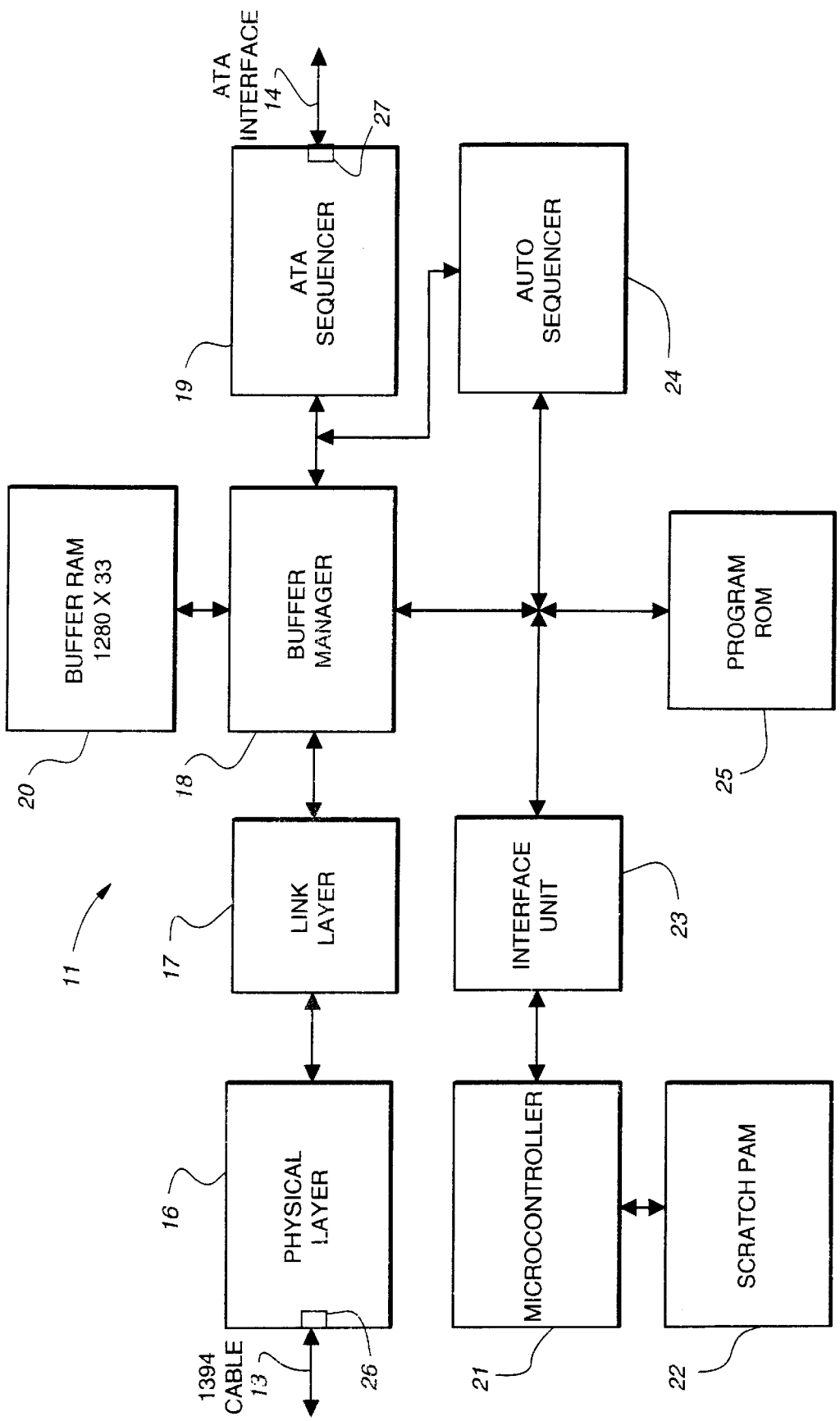
FIG. 2 is a showing of the construction and arrangement of FIG. 1's interface unit.

FIG. 2 shows the construction and arrangement of FIG. 1 interface unit 11. Interface unit 11 includes an integrated RAM 20 having an inbound, or receive FIFO queue, and an outbound, or transmit FIFO queue (not shown), an integrated microcontroller or microprocessor 21, and a program ROM 25.

A buffer manager 18 and buffer RAM 20 cooperate with a link layer 17 and with a physical layer 16 whose bit serial 1394-port 26 is connected to an end of 1394 cable 13. Buffer manager 18 also cooperates with an ATA sequencer 19 whose bit parallel ATA port 27 is connected to one end of ATA interface 14. Interface unit 11 is controlled by a microprocessor 21, in cooperation with a scratch RAM 22, an interface unit 23, an auto sequencer 24, and a program ROM 25.

ATA sequencer 19 assists in the sending of transmit-data to host 10. In addition, ATA sequencer 19 is responsible for managing the interface unit's ATA interface, and the generation and processing of 1394 transactions for the data phase of a host transfer that was programmed by a 32-byte operational request block (i.e., a 32-btye ORB).

Physical and link modules 16, 17 constantly monitor bit serial 1394 bus 13 for transactions or packets that are destined for target device 15; i.e., for interface 11 and/or mass storage device 12. Once a transaction is detected, physical and link modules 16, 17 operate to store the transaction into the receive FIFO (not shown in FIG. 2) that is contained within buffer RAM 20. There are two fields in the first 4-bytes (i.e., the first quadlet) of a data packet that operate to identify the type of packet and the destination of the packet.

One such field is a transaction code or "tCode" field, i.e., a 4-bit field that identifies the packet type, for example, a write request for a data quadlet, a write request for a data block, a write response, a read request for a data quadlet, a read request for a data block, a read response for a data quadlet, a read response for a data block, a cycle start, a lock request, or a lock response.

The other of these two fields is a transaction label or "tLabel" field; i.e., a 6-bit field that ties a response transaction to a given request transaction. Each of the blocks that can send request packets will only send 6-bit "tLabel" values relative to the operation of microprocessor 21, relative to an ORB fetch by auto sequencer 24, relative to a page table fetch by ATA sequencer 19, and relative to a data fetch by ATA sequencer 19.

By way of example, reads and writes to mass storage device 12 are identified as such, and as large-size packets. Control commands that are sent by host 10 to target device 15 are identified as such, and as small-size packets. The above-described ORBs comprise a form of small-size packets.

Figure 3:
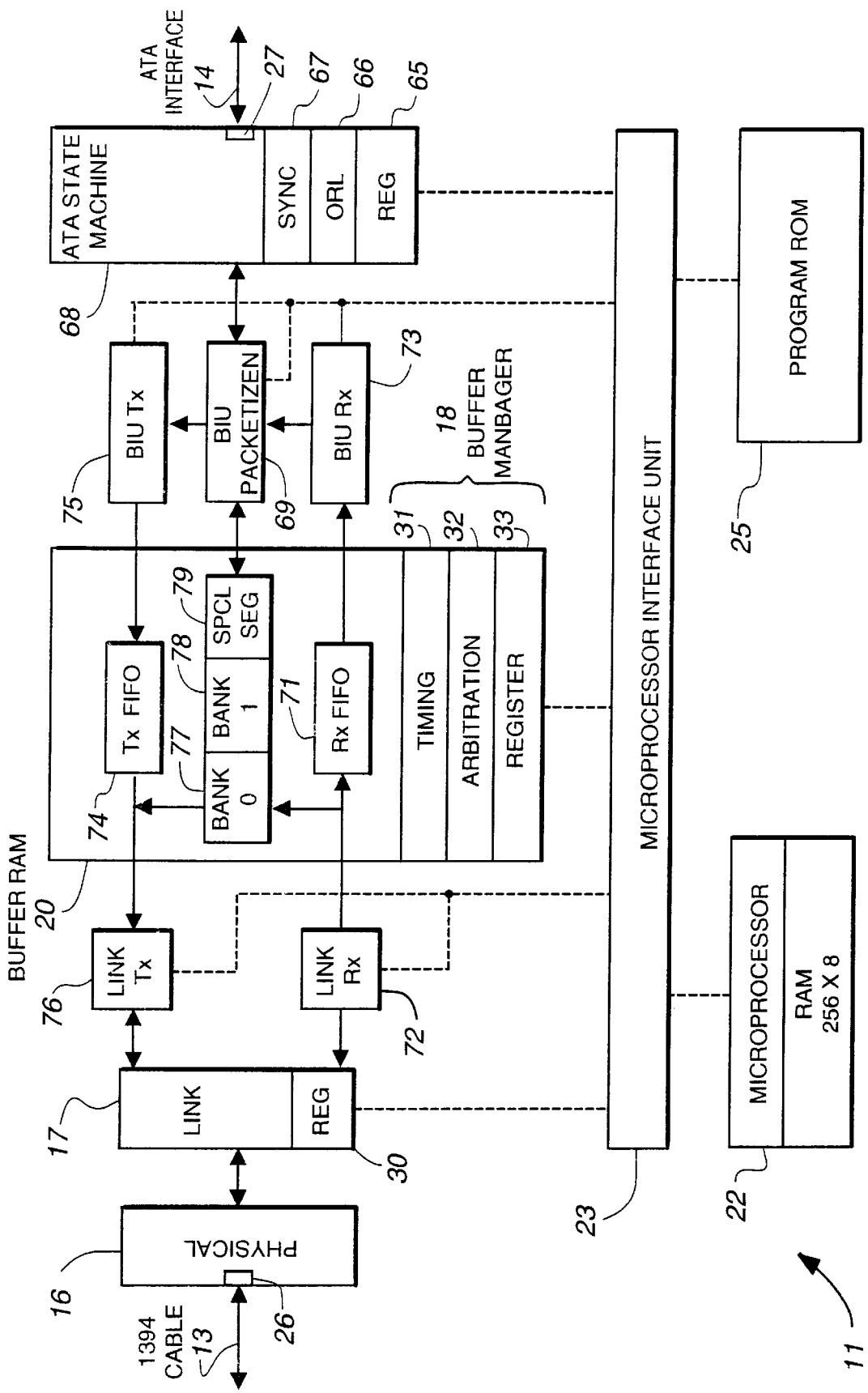
FIG. 3 is another showing of the construction and arrangement of FIG. 1 interface unit.

FIG. 3 is another showing of the construction and arrangement of FIG. 1 interface unit 11. A transmit to host event that passes from interface unit 11 to host 10, as well as a receive from host event that passes from host 10 to interface unit 11, are processed by physical layer 16 and link layer 17, this later unit 17 having registers 30 that enable communication with microprocessor 22. A transmit-event includes the operation of a transmit link 76, whereas a receive event includes the operation of a receive link 72. Transmit and receive links 76, 72 also are connected to interface unit 23, to thereby enable communication with microprocessor 22.

Buffer RAM 20 is controlled by buffer manager 18 that includes a timing section 31, an arbitration section 32, and registers 33 that enable communication with microprocessor 22. As more clearly shown in FIG. 5, buffer manager 18 operates to divide buffer RAM into a transmit FIFO storage section 74, a bank 0 storage section 77, a bank 1 storage section 78, a special segment storage section 79, and a receive FIFO storage section 71.

A Bus Interface Unit (BIU) packetizer 69 cooperates with bank 0, bank 1, and special segment 79 to handle (i.e., to receive and to transmit) large-size packets relative to an ATA state machine 68 having a bit parallel ATA port 27. As shown, ATA sitate machine 68 includes a synchronizing section 67, a CRC section 66, and registers 65 that enable communication with microprocessor 22.

Receive FIFO 71, receive BIU 73, BIU packetizer 69, and ATA state machine 68 operate to pass the head end, small-size data entry from receive FIFO 71 to mass storage device 12, whereas ATA state machine 68, BIU packetizer 69, transmit BIU 75, and transmit FIFO 74 operate to pass small-size data from mass storage device 12 to the tail end of transmit FIFO 74.

When large-size data is received from host 10, it is placed in a buffer RAM 20 storage location, and its buffer RAM address is placed in receive FIFO 71. When large-size data is received from mass storage device 12, it is placed in a buffer RAM 20, and its buffer RAM address is placed in transmit FIFO 74.

Transmit BIU 75, BIU packetizer 69, and receive BIU 73 are also connected so as to enable communication with microprocessor 22. Above-mentioned elements 75, 69, 73, 68, 67, 66, and 65 comprise FIG. 2 ATA sequencer 19 and auto sequencer 24.

Figure 4:
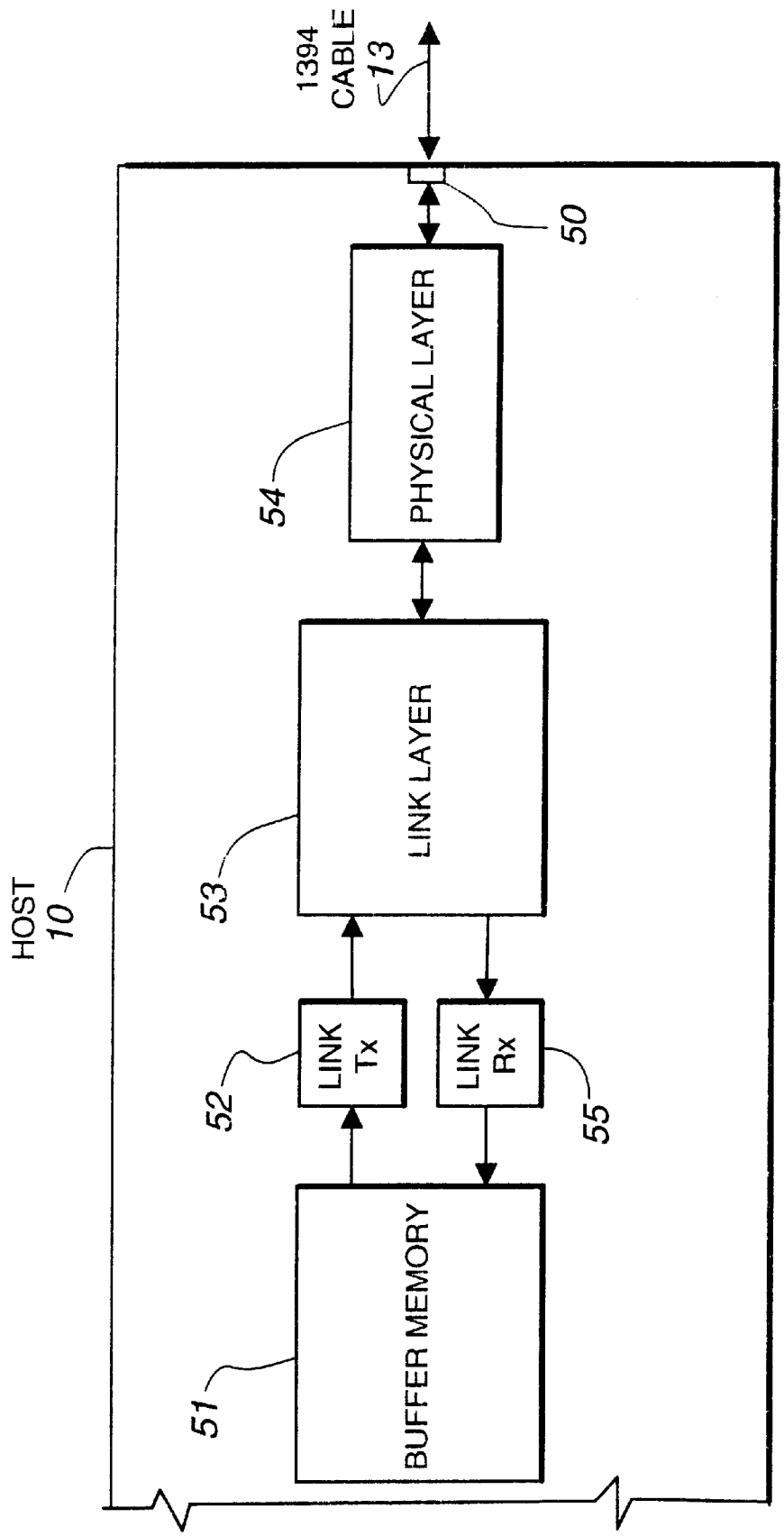
FIG. 4 is a showing of the transmit/receive portion of FIG. 1's host, this portion being connected to the host end of the 1394-cable shown in of FIG. 1

FIG. 4 is an example of the transmit/receive portion of FIG. 1's host 10 that connects to the host's bit serial 1394 port 50 that connects to one end of IEEE 1394 cable 13. The other end of 1394 cable 13 connects to the bit serial 1394 port 26 of FIG. 4 interface unit 11, and thereby to the receive/transmit portion of FIG. 4 interface unit 11.

The host's transmit portion includes a buffer memory 51, a transmit link 52, a link layer 53, and a physical layer 54. The host's receive portion includes physical layer 54, link layer 53, a receive link 55, and buffer memory 51.

Figure 5:
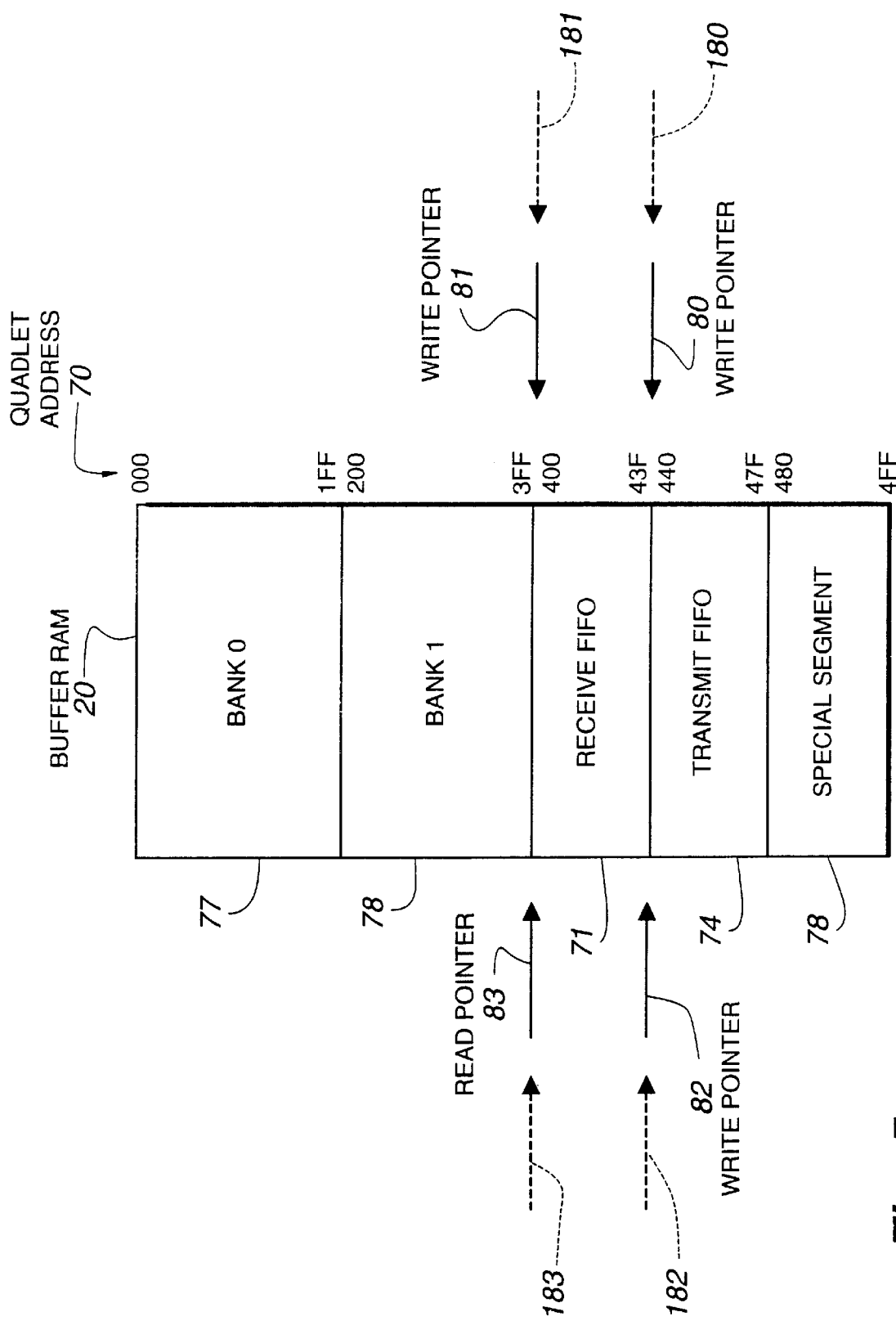
FIG. 5 is a showing of the partitioning of the FIGS. 2, 3 buffer RAM, wherein each partition's beginning and ending quadlet addresses is shown in hexadecimal.

FIG. 5 shows the partitioning of buffer RAM 20 wherein each partition's beginning and ending quadlet address 70 is shown in hexadecimal notation. Buffer manager 18 operates to partition buffer RAM 20 into these several dedicated segment is for use by the various elements of interface unit 11.

Receive-FIFO 71 is used to receive and temporarily store small-size receive packets as they are received from FIG. 3 receive link 72. When the receive packet is of a large size, its data content is placed in a buffer RAM portion 77, 78 or 79, and only a header, an address, or a pointer that points to this buffer storage location is placed in receive FIFO 71. Only one receive-BIU 73 can read receive-FIFO 71 at any given time, and all packets within receive FIFO 71 are service by receive BIU 73 in the order in which they are received.

Transmit FIFO 74 is used to send packets to FIG. 3 transmit link 75. Only one transmit BIU 75 can write to transmit FIFO 74 at any given time, and all packets within transmit FIFO 74 are serviced by transmit link 76 in the order in which they are received by transmit FIFO 74. When a packet at the head end storage location of transmit FIFO 74 is a small-size data packet, this small-size packet is transmitted to transmit link 76. When the head end storage location of transmit FIFO 74 contains a header, a storage address, or a pointer that corresponds to a large-size data packet that is stored in buffer 77, 78, 79, then this large-size data packet is fetched from the indicated buffer storage location and transmitted to transmit link 76.

The data block portion of an ATA sequencer 19 block read response (tLabel=11?xxxb) will either go to 77, bank 0, or to 78, bank 1, depending upon bit 3 of the block read response. The data block portion of an ORB fetch block read response (tLabel=01xxxxb) will be stored in special segment 79 at a byte offset that is indicated by tLabel [3:0]*32.

The data block portion of a block write request, a block read request, a block read response, or a block response can be fetched from any offset from either bank 0, bank 1, or special segment 79, or simply from the next few quadlets in transmit FIFO 74.

Special segment 79 can be used as FIG. 2's special purpose scratch RAM 22. Auto sequencer 24 uses special segment 79 to store the result of an ORB fetch, and ATA sequencer 19 stores the results of a status fetch in special segment 79.

In order to be able to retransmit a packet due to an error or a busy response, or in order to be able to reject a bad packet, both a read pointer 80 on transmit FIFO 74 and a write pointer 81 on receive FIFO 71 are respectively tied to FIG. 3 transmit link 76 and receive link 72. The respective pointers 80, 81 have a shadow pointer 180, 181. These shadow pointers 180, 181 update to the value of the corresponding actual pointer 80, 81 when a transfer has been successfully completed and verified. In the case of a transfer error, the actual pointer 80, 81 loads the shadow-pointer 180, 181 value.

In order to allow a packet to be stored into a FIFO before attempting to send it, or in order to allow time to process the packet at the head end of receive FIFO 71 without having to copy the packet to local memory, both a write pointer 82 on transmit FIFO 74 and a read pointer 83 on receive FIFO 71 also have a corresponding shadow pointer 182, 183. Shadow pointers 182, 183 are updated to the corresponding values of actual pointers 82, 83 when a transfer has been successfully completed and verified. Since no errors are defined on this side of the transmit and receive FIFO's 74, 71, the values of actual pointers 82, 83 never update to the value of the corresponding shadow pointer 182, 183.

In operation, the above-mentioned relatively small-size data packets and the above-mentioned relatively large-size data packets are identified as such by the use of a header. This header is detected by the operation of receive link 72, transmit link 76, and BIU packetizer 69.

More specifically, each packet of these two size types includes a data field whose value content identifies the packet as being of a small size or a large size. The manner of so identifying these two types of data packets is not critical to this invention.

In order to accomplish the data transmit/receive functions relative to host 10, a relatively small size receive FIFO 71 is associated with a receive from host data path 26, 16, 17, 72, and a relatively small size transmit FIFO 74 is associated with a transmit to host data path 27, 68, 69, 74, 76, 17, 16, 26.

When a small-size packet (for example, a command from host 10 to target device 15), is received by bit serial port 26 of interface unit 11, receive link 72 operates to enter this small-size packet into the tail end of receive FIFO 71. Thereafter, this small-size packet is executed, processed, or passed on, to mass storage device 12 when it is fetched from the head end of receive FIFO 71.

When a large-size packet (for example, data to be written to mass storage device 12), is received by bit serial port 26 of interface unit 11, received link 72 operates to enter, the packet's data content into bank 0, bank 1, or special segment 79, and to enter the corresponding buffer RAM address of this stored data content into the tail end of receive FIFO 71. Later, when this RAM address reaches the head end of receive FIFO 71, receive BIU 73 and BIU packetizer 69 operate to fetch the data from the indicated address within buffer RAM 20, where upon appropriate action is taken.

When a small-size packet (for example, a response from interface unit 11 to host 10 or from mass storage device 12 to host 10), is received by transmit FIFO 74, the small-size packet is stored at the tail end of transmit FIFO 74. Later, when this small-size packet has reached the head end of transmit FIFO 74, transmit link 76 operates to process the small-size packet.

When a large-size packet is received by BIU packetizer 69, the large-size packet is stored in buffer RAM portions 77, 78, or 79, and the address of this large-size packet is stored in the tail end of transmit-FIFO 74. Later, when this address has reached the head end of transmit FIFO 74, the corresponding large-size packet is fetched from buffer RAM 20, whereupon the large-size packet passes on to transmit link 76 for transmission to host 10.

In this manner, small-size transmit to host and receive from host data packets are directly handled by the respective FIFOs 74, 71, whereas these same FIFOs operate to store the time order address, or the as-received queue, of large-size transmit to host and receive from host packets, as the data content of these large-size packets are stored in a large data bank that is provided by bank 0, bank 1 and special segment 79.

In this way, this invention optimizes the size of the two FIFOs 71, 74 and data bank 77, 78, 79 for a given size of a relatively large size core data storage that is associated therewith; for example, host store 51 shown in FIG. 4.

In a non-limiting embodiment of the invention, the above-mentioned small-size packets were received asynchronously and then FIFO stored, and the large-size packets were transmitted, or received, asynchronous half-duplex, the headers of the large-size data packets were FIFO stored as the corresponding data content was stored in a the buffer or data bank. As a result of the use of these two FIFOs, two messages going in either direction can be queued.

In the operation of this invention, the headers of the half-duplex large-size packets are always found in transmit FIFO 74 for a transmit to host operation of interface unit 11, and are always placed in receive-FIFO 71 for a receive-from-host operation of interface unit 11. Any given header of a large-size packet identifies, or addresses, a storage location in data bank 77, 78, 79, whereat the packet's data content can be found. That is, the large-size data that corresponds to the given header will be fetched from the data bank for a transmit to host operation, or the large-size data that corresponds to the given header will be stored in the data bank for a receive from host operation.

For example, in an asynchronous half-duplex transmit to host operation involving a large-size data packet, the packet's header is first fetched from the head end storage position within the transmit FIFO, the address that is within this fetched header is read, the data found at this address is fetched from a data bank, and the transmission is completed. In a receive from host operation, the data portion of an asynchronously received half-duplex large-size data packet is placed in a given storage location within a data bank, and the tail end storage location of the receive FIFO is loaded with a header that contains the address of this given data bank storage location, whereupon the receive operation is completed.

As a feature of the invention, a special segment of RAM is provided for use as a general purpose scratch pad. For example, this special segment RAM can be set up as 16 different Operational Request Block (ORB) locations, each location of which can be used to store a 32-byte ORB. The header for each such ORB is placed in the receive FIFO, whereas the data content of the ORB itself placed in this special segment RAM.

Figure 6:
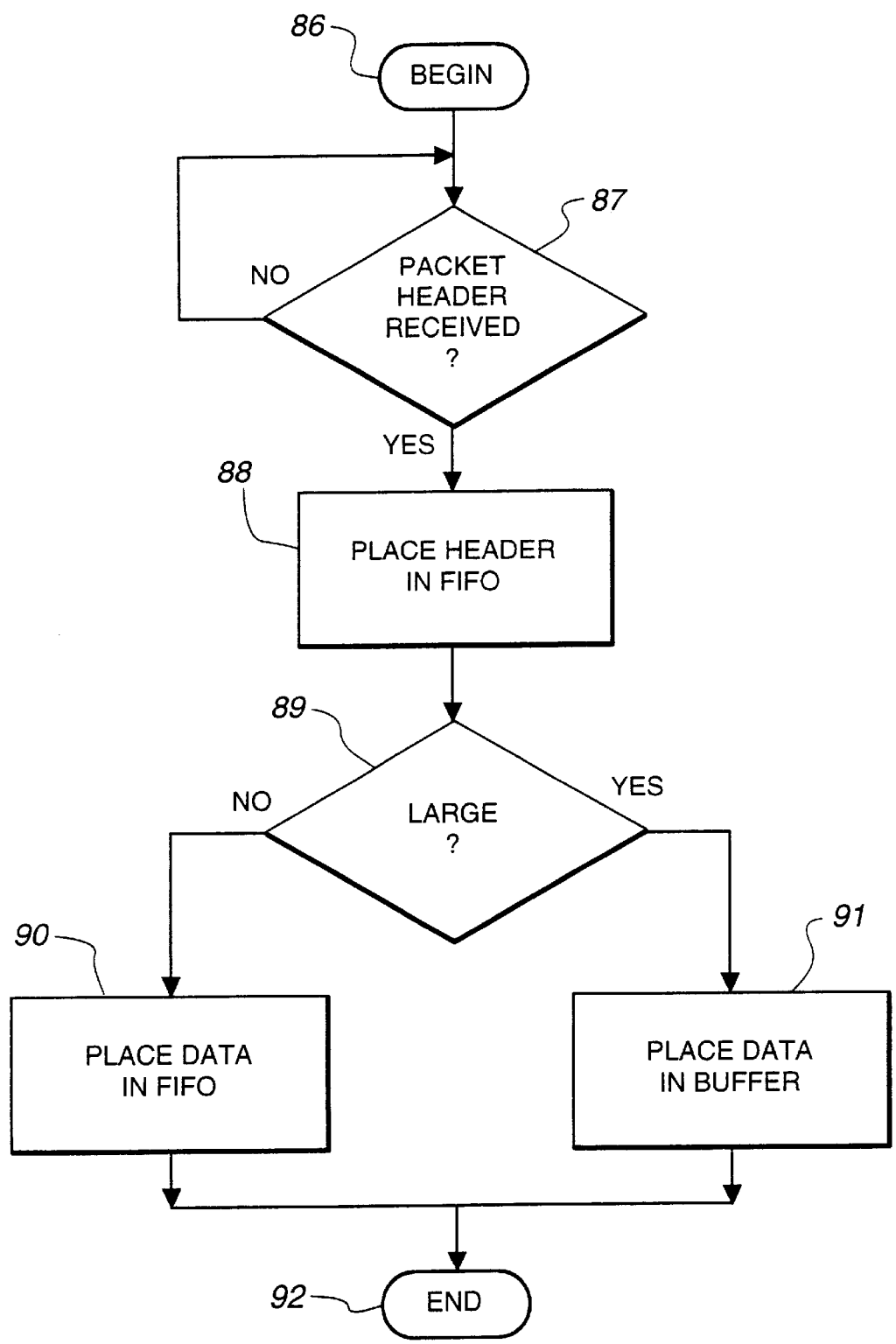
FIG. 6 is a flowchart that shows the operation of the FIGS. 2, 3 interface unit, this operation being typical of an operation wherein the interface unit's bit serial host port receives either a small size data packet, or a large-size data packet from the host, and also being typical of an operation wherein the interface unit bit parallel mass storage device port receives either a small-size data packet or a large-size data packet from the mass storage device.

FIG. 6 is a flowchart that shows the operation of the FIGS. 2, 3 interface unit 11, this operation being typical of an operation wherein the interface unit's bit serial host port 26 receives either a small-size data packet or a large-size data packet from host 10, and also being typical of an operation wherein the interface unit's bit parallel mass storage device port 27 receives either a small-size data packet or a large-size data packet from mass storage device 12.

The FIG. 6 process begins at event 86. Thereafter, decision function 87 continuously monitors for the presence of a packet that is received by port 26 or by port 27. When a "Yes" condition is detected, function 88 operates to placed the header of the received packet into FIFO 71 or FIFO 74, whereupon decision function 89 operates to determine if the packet is of a large size.

If it is a large-size packet, function 91 operates to place the packet's data content into buffer 77, 78 or 79, and the process ends at 92. If the packet is a small-size packet, the packet's data is placed in FIFO 71 or FIFO 74, and the process ends at 92.

Figure 7:
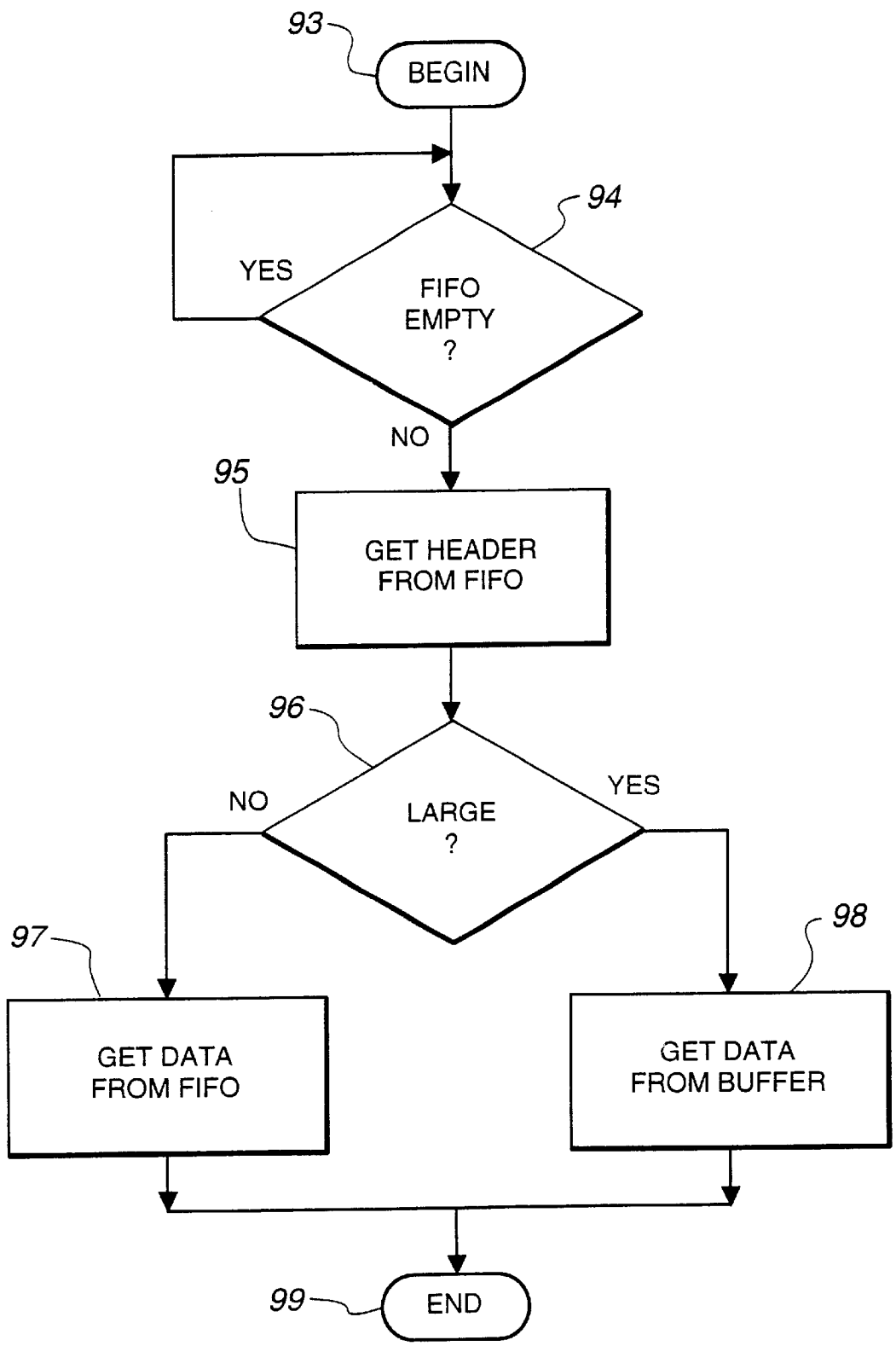
FIG. 7 is a flowchart that shows the operation of the FIGS. 2, 3 interface unit, this operation being typical of an operation wherein the head end storage location of the interface unit's receive FIFO contains the header of either a small-size data packet or a large-size data packet, and also being typical of an operation wherein the head end storage location of the interface unit's transmit FIFO contains the header of either a small-size data packet or a large-size data packet.

FIG. 7 is a flowchart that shows the operation of the FIGS. 2, 3 interface unit 11, this operation being typical of an operation wherein the head end storage location of the interface unit's receive FIFO 71 contains the header of either a small-size data packet or a large-size data packet, and also being typical of an operation wherein the head end storage location of the interface unit's transmit FIFO 74 contains the header of either a small-size data or a large-size data packet.

The FIG. 7 process begins at event 92. Thereafter, decision function 94 continuously monitors for the presence of a header in receive-FIFO 71 or transmit-FIFO 74. When a "Yes" condition is detected, function 95 operates to fetch the header from the FIFO, whereupon decision function 96 operates to determine if the associated data packet is of a large-size.

If it is a large-size packet, function 98 operates to fetch the large-size data packet from the buffer storage location that is indicated by the associated header, and the process ends at 99. If the packet is a small-size packet, the packet's data is fetched from the FIFO, and the process ends at 99.

From the above description it can be seen that this invention provides a method/apparatus whereby two-way communication of small byte-size packets and large byte-size packets is provided between a first port 26 having a first device 10 connected thereto, and a second port 27 having a second device 12 connected thereto. This construction and arrangement includes a first and a second FIFO storage 71, 74, and a buffer storage 77, 78, 79. The reception of a small-byte size packet at the first port 26 from the first device 10 causes the small byte-size packet to be stored in a tail end storage location of the first FIFO storage 71. The reception of a large byte-size packet at first port 26 from first device 10 causes the large byte-size packet to be stored in an addressable storage location of the buffer storage 77, 78, 79, and causes an address of this storage location to be stored in a tail end storage location of first FIFO storage 71.

Subsequently, when the presence of said small byte-size packet in a head end storage location of first FIFO storage 71 is detected, the small byte-size packet is transmitted to the second port 27 and to the second device 12. When the presence of the address of an addressable storage location is detected in a head end storage location of first FIFO storage 71, the corresponding large byte-size packet is fetched from buffer byte storage 77, 78, 79 and it is transmitted to second port 27 and to second device 12.

The reception of a small byte-size packet at the second port 27 from the second device 12 causes the small byte-size packet to be stored in a tail end storage location of the second FIFO storage 74. The reception of a large byte-size packet at second port 27 from second device 12 causes the large byte-size packet to be stored in an addressable storage location of buffer storage 77, 78, 79, and causes an address of the addressable storage location to be stored in a tail end storage location of second FIFO storage 74.

Subsequently, when the presence of the small byte-size packet is detected in a head end storage location of second FIFO storage 74, the small byte-size packet is transmitted to the first port 26 and to the first device 10. When the presence of the address of an addressable storage location is detected in a head end storage location of second FIFO storage 74, the corresponding large byte-size packet is fetched from buffer storage 77, 78, 79, and it is transmitted to first port 26 and to first device 10.

While this invention has been described in detail while making reference to preferred embodiments thereof, it is known that those skilled in the art will, upon learning of this invention, readily visualize yet other embodiments that are within the spirit and scope of this invention. Thus, the above detailed description is not to be taken as a limitation on the spirit and scope of this invention.

What is claimed is:

1. An interface unit adapted to bidirectionally interconnect a first device and a second device, the interface unit comprising:

a first port adapted to connect to said first device so as to receive data packets from said first device and so as to transmit data packets to said first device;

a second port adapted to connect to said second device so as to receive data packets from said second device and so as to transmit data packets to said second device;

first FIFO storage;

second FIFO storage;

buffer storage;

first port-receiving means responsive to said first port receiving a first data packet of a first characteristic and operable to store said first data packet of said first characteristic in a tail end location of said first FIFO storage, and responsive to said first port receiving a second data packet of a second characteristic and operable to store said second data packet of said second characteristic in said buffer storage and to store a corresponding buffer address in said tail end location of said first FIFO storage;

first means responsive to a head end location of said first FIFO storage containing said first data packet of said first characteristic for fetching and processing said first data packet of said first characteristic, and responsive to said head end location of said first FIFO storage containing said corresponding buffer address for fetching said second data packet of said second characteristic from said buffer storage and processing said second data packet of said second characteristic;

second port-receiving means responsive to said second port-receiving a third data packet of said first characteristic and operable to store said third data packet of said first characteristic in a tail end location of said second FIFO storage, and responsive to said second port receiving a fourth data packet of said second characteristic and operable to store said fourth data packet of said second characteristic in said buffer storage and to store a corresponding buffer address in said tail end location of said second FIFO storage; and second means responsive to a head end location of said second FIFO storage containing said third data packet of said first characteristic for fetching and processing said third data packet of said first characteristic, and responsive to said head end location of said second FIFO storage containing said corresponding buffer address for fetching said fourth data packet of said first characteristic from said buffer storage and processing said fourth data packet of said first characteristic.

2. The interface unit of claim 1, wherein:

said processing of said first and second data packets includes transmitting said first and second data packets to said second-port; and said processing of said third and fourth data packets includes transmitting said second and third data packets to said first port.

3. The interface unit of claim 2 wherein said first port is connected to a host computer and said second port is connected to a mass storage device.

4. The interface unit of claim 3 wherein:

said first and third packets of said first characteristic comprise control data having a relatively small byte-size characteristic; and said second and third packets of said second characteristic comprise read/write data having a relatively large byte-size characteristic.

5. The interface unit of claim 1 wherein:

said processing of said first and second data packets includes transmitting said first and second data packets from said second port to said second external device; and said processing of said third and fourth data packets includes transmitting said second and third data packets from said first port to said first external device.

6. The interface unit of claim 5 wherein:

said second device is a mass storage device; and said first-device is a host computer.

7. The interface unit of claim 6 wherein:

said first and third packets of said first characteristic comprise control data having a relatively small byte size; and said second and third packets of said second characteristic comprise read/write data having a relatively large byte size.

8. The interface unit of claim 1 including:

a bit parallel interface connecting said second port to said second external device; and a bit serial interface connecting said first port to said first external device.

9. The interface unit of claim 8 wherein:

said second device is a mass storage device; and said first device is a host computer.

10. The interface unit of claim 8 including:

a first link connecting said first port to said first FIFO storage and to said buffer storage; and a second link connecting said first port to said second FIFO storage and to said buffer storage.

11. The interface unit of claim 10 including:

a packetizer unit;

a bus interface state machine;

a first bus interface unit;

a second bus interface unit;

a first circuit including said bus interface state machine and said first bus interface unit connecting said second port to said buffer storage and said first FIFO storage; and a second circuit including said bus interface state machine and said second bus interface unit connecting said second port to said buffer storage and said second FIFO storage.

12. The interface unit of claim 11 wherein:

said second device is a mass storage device; and said first device is a host computer.

13. The interface unit of claim 12 wherein:

said bit parallel interface connecting said second port to said second external device is an ATA interface; and said bit serial interface connecting said first port to said first external device is an IEEE 1394 interface.

14. The interface unit of claim 13 wherein:

said first characteristic is a relatively small packet size; and said second characteristics is a relatively large packet size.

15. The interface unit of claim 14 including:

a microprocessor and program storage for controlling operation of said interface unit.

16. A method of bidirectionally interfacing a first device to a second device, comprising the steps of:

providing a first port that is adapted to connect to said first device so as to receive multi-byte data packets from said first device and so as to transmit multi-byte data packets to said first device;

providing a second port that is adapted to connect to said second device so as to receive multi-byte data packets from said second device and so as to transmit multi-byte data packets to said second device;

providing first FIFO storage;

providing second FIFO storage;

providing buffer storage;

providing first port receiving means connected to said first port and responsive to said first port receiving a first data packet of a small byte characteristic and operable to store said first data packet in a tail end location of said first FIFO storage, and responsive to said first-port receiving a second data packet of a large byte characteristic and operable to store said second data packet in said buffer storage and to store a corresponding buffer address in said tail end location of said first FIFO storage;

providing first responsive means that is responsive to a head end location of said first FIFO storage containing said first data packet for fetching and processing said first data packet, and responsive to said head end location of said first FIFO storage, containing said corresponding buffer address for fetching said second data packet from said buffer storage and processing said second data packet;

providing second port-receiving means connected to said second port and responsive to said second port receiving a third data packet of said small byte characteristic and operable to store said third data packet in a tail end location of said second FIFO storage, and responsive to said second port receiving a fourth data packet of said large byte characteristic and operable to store said fourth data packet in said buffer storage and to store a corresponding buffer address in said tail end location of said second FIFO storage; and second responsive means responsive to a head end location of said second FIFO storage containing said third data packet for fetching and processing said third data packet, and responsive to said head end location of said second FIFO storage containing said corresponding buffer address for fetching said fourth data packet from said buffer storage and processing said fourth data packet.

17. The method of claim 16, wherein:

said processing of said first and second data packets includes transmitting said first and second data packets to said second port; and said processing of said third and fourth data packets includes transmitting said second and third data packets to said first port.

18. The method of claim 17 wherein said first port is connected to a host computer and said second port is connected to a mass storage device.

19. The method of claim 18 including the steps of:

providing a bit parallel interface connecting said second port to said mass storage device; and providing a bit serial interface connecting said first port to said host computer.

20. The method of claim 19 including the steps of:

providing a first link that connects said first port to said first FIFO storage and to said buffer storage; and providing a second link that connects said first port to said second FIFO storage and to said buffer storage.

21. The method of claim 20 including the steps of:

providing a packetizer unit;

providing a bus interface state-machine;

providing a first bus interface unit;

providing a second bus interface unit;

providing a first circuit that includes said bus interface state machine and said first bus interface unit that connects said second port to said buffer storage and said first FIFO storage; and providing a second circuit that includes said bus interface state machine and said second bus interface unit that connects said second port to said buffer storage and said second FIFO storage.

22. The method of claim 21 wherein:

said bit parallel interface connecting said second port to said mass storage device is an ATA interface; and said bit serial interface connecting said first port to said host computer in an IEEE 1394 interface.

23. A method providing communication of small byte-size data packets and large byte size-data packets from a first to a second port, comprising the steps of:

providing FIFO byte storage;

providing buffer byte storage;

responding to the reception of a small byte-size data packet at said first port and storing said small byte-size data packet in a tail end storage location of said FIFO byte storage;

responding to the reception of a large byte-size data packet at said first port, storing said large byte-size data packet in an addressable storage location of said buffer byte storage, and storing an address of said addressable storage location in a tail end storage location of said FIFO byte storage;

responding to the presence of said small byte-size data packet in a head end storage location of said FIFO byte storage and transmitting said small byte-size data packet to said second port; and responding to the presence of said address of said addressable storage location in a head end storage location of said FIFO byte storage, fetching said large byte-size data packet from said buffer byte storage, and transmitting said large byte-size data packet to said second port.

24. Apparatus providing communication of small byte-size data packets and large byte size-data packets from a first to a second port, comprising:

FIFO byte storage;

buffer byte storage;

means responsive to the reception of a small byte-size data packet at said first port for storing said small byte-size data packet in a tail end storage location of said FIFO byte storage;

means responsive to the reception of a large byte-size data packet at said first port for storing said large byte-size data packet in an addressable storage location of said buffer byte storage and for storing an address of said addressable storage location in a tail end storage location of said FIFO byte-storage;

means responsive to the presence of said small byte-size data packet in a head end storage location of said FIFO byte storage for transmitting said small byte-size data packet to said second port; and means responsive to the presence of said address of said addressable storage location in a head end storage location of said FIFO byte storage for fetching said large byte-size data packet from said buffer byte storage and for transmitting said large byte-size data packet to said second port.

25. A method providing two-way communication of small byte-size packets and large byte-size packets between a first port having a first device connected thereto and a second port having a second device connected thereto, comprising the steps of:

providing a first and a second FIFO storage;

providing buffer storage;

responding to the reception of a small byte-size packet at said first port from said first device and storing said small byte-size packet in a tail end storage location of said first FIFO storage;

responding to the reception of a large byte-size packet at said first port from said first device, storing said large byte-size packet in an addressable storage location of said buffer storage, and storing an address of said addressable storage location in a tail end storage location of said first FIFO storage;

responding to the presence of said small byte-size packet in a head end storage location of said first FIFO storage and transmitting said small byte-size packet to said second port and to said second device;

responding to the presence of said address of said addressable storage location in a head end storage location of said first FIFO storage, fetching said large byte-size packet from said buffer storage, and transmitting said large byte-size packet to said second port and to said second device;

responding to the reception of a small byte-size packet at said second port from said second device and storing said small byte-size packet in a tail end storage location of said second FIFO storage;

responding to the reception of a large byte-size packet at said second port from said second device, storing said large byte-size packet in an addressable storage location of said buffer storage, and storing an address of said addressable storage location in a tail end storage location of said second FIFO storage;

responding to the presence of said small byte-size packet in a head end storage location of said second FIFO storage and transmitting said small byte-size packet to said first port and said first device; and responding to the presence of said address of said addressable storage location in a head end storage location of said second FIFO storage, fetching said large byte-size packet from said buffer storage, and transmitting said large byte-size packet to said first port and said first device.

26. Apparatus providing two-way communication of small byte-size packets and large byte-size packets between a first port having a first device connected thereto and a second port having a second device connected thereto, comprising:

first FIFO storage;

second FIFO storage, buffer storage;

means responsive to the reception of a small byte-size packet at said first port from said first device for storing said small byte-size packet in a tail end storage location of said first FIFO storage;

means responsive to the reception of a large byte-size packet at said first port from said first device for storing said large byte-size packet in an addressable storage location of said buffer storage and for storing an address of said addressable storage location in a tail end storage location of said first FIFO storage;

means responsive to the presence of said small byte-size packet in a head end storage location of said first FIFO storage for transmitting said small byte-size packet to said second port and to said second device;

means responsive to the presence of said address of said addressable storage location in a head end storage location of said first FIFO storage for fetching said large byte-size packet from said buffer storage and for transmitting said large byte-size packet to said second port and to said second device;

means responsive to the reception of a small byte-size packet at said second port from said second device for storing said small byte-size packet in a tail end storage location of said second FIFO storage;

means responsive to the reception of a large byte-size packet at said second port from said second device for storing said large byte-size packet in an addressable storage location of said buffer storage and for storing an address of said addressable storage location in a tail end storage location of said second FIFO storage;

means responsive to the present of said-small byte-size packet in a head end storage location of said second FIFO storage for transmitting said small byte-size packet to said first port and said first device; and means responsive to the presence of said address of said addressable storage location in a head end storage location of said second FIFO storage for fetching said large byte-size packet from said buffer storage and for transmitting said large byte-size packet to said first port and said first device.

27. Interface apparatus providing for the transmission of small-size packets and large-size packets between a first device and a second device, comprising:

a first FIFO connected to receive from said first device and to transmit to said second device;

a second FIFO connected to receive from said second device and to transmit to said first device;

buffer storage;

first means responsive to small-size packets received from said first device for storing said small-size packets in said first FIFO;

second means responsive to large-size packets received from said first device host for storing said large-size packets in said buffer storage and for storing a corresponding buffer storage address in said first FIFO;

third means responsive to small-size packets received from said second device for storing said small-size packets in said second FIFO; and fourth means responsive to large-size packets received from said second device for storing said large-size packets in said buffer storage and for storing a corresponding buffer storage address in said second FIFO.

28. The interface apparatus of claim 27, including:

fifth means responsive to said stored small-size packets in said first FIFO for transmitting said small-size packets to said second device;

sixth means responsive to said stored corresponding buffer storage address in said first FIFO for fetching said stored large-size packets from said buffer storage and for transmitting said fetched large-size packet to said second device;

seventh means responsive to said stored small-size packets in said second FIFO for transmitting said small-size packets to said first device; and eighth means responsive to said stored corresponding buffer storage address in said second FIFO for fetching said stored large-size packets from said buffer storage and for transmitting said fetched large-size packet to said first device.

29. The interface apparatus of claim 28 wherein said first device is a computer and said second device is a packet storage device.

30. The interface apparatus of claim 29 wherein said computer is IEEE 1394 compatible and said packet storage device is ATA compatible.

31. An interface unit comprising:
a first interface port;
a second interface port;
a memory;
a receive FIFO stack;
a transmit FIFO stack;
a linker having a bi-directional connection to said first interface port, a bi-directional connection to said memory, and a uni-directional link into said receive FIFO stack;
a packetizer having a bi-directional connection to said memory and said second interface port, and a uni-directional connection into said transmit FIFO stack,
said receive FIFO stack having a uni-directional connection to said packetizer, and
said transmit FIFO stack having a uni-directional connection into said linker,
wherein said interface unit is capable of communicating half duplex data packets bi-directionally between said first and second interface ports while simultaneously communicating full duplex control packets through said first port.

32. An interface unit as recited in claim 31, wherein said memory comprises an independently addressable memory.

33. An interface unit as recited in claim 31, wherein said memory comprises at least two memory banks to maintain performance of said interface unit.

34. An interface unit as recited in claim 31, wherein said linker includes a link receiver that bifurcates data packets received from said first interface port into a header and a payload, said link receiver stores said header and an address pointer into said receive FIFO stack and stores said payload in a location in said memory corresponding to said address pointer.

35. An interface unit as recited in claim 34, wherein said packetizer includes a packetizer receiver that accepts said header and said address pointer from said receive FIFO stack and retrieves said payload from said location in said memory corresponding to said address pointer to reconstruct said data packet.

36. An interface unit as recited in claim 31, wherein said linker includes a link transmitter that accepts a header and an address pointer from said transmit FIFO stack and retrieves said payload from a location in said memory corresponding to said address pointer location to reconstruct a data packet.

37. An interface unit as recited in claim 36, wherein said packetizer includes a packetizer transmitter that bifurcates said data packets received from said second interface port into said header and said payload and stores said header and said address pointer in said transmit FIFO stack and stores said payload in said location in said memory corresponding to said address pointer.

38. An interface unit as recited in claim 31, wherein said linker includes a link receiver that accepts a control packet and stores said control packet in said receive FIFO stack.

39. An interface unit as recited in claim 31, wherein said first port is an IEEE 1394 interface.

40. An interface unit as recited in claim 31, wherein said second port is an ATA interface.

41. A method for communicating payloads from a first interface port to a second interface port comprising the steps of:
accepting packets from said first interface port;
bifurcating said packets into received control packets and received data packets;
bifurcating data packets into header and payload;
storing said payload in at least one memory bank;
storing said header and said received control packets in a receive FIFO stack;
retrieving said header from said receive FIFO stack;
retrieving said payload and said received control packets from said at least one memory bank;
associating said header with said payload to enable transmission of said payload to said second interface port.

42. The method for communicating payloads as recited in claim 41 further comprising the steps of:
accepting transmit payloads from said second port;
generating header information for said transmit payloads;
storing said payload in at least one memory bank;
storing said header and said transmit control packets in a transmit FIFO stack;
retrieving said header and transmit control packets from said transmit FIFO stack;
generating transmit control packets from said receive control packets;
retrieving said payload from said at least one memory bank;
assembling said header and said payload to reconstruct said data packet, and
transmitting said data packets and said transmit control packets over said first port.

* * * * *